United States Patent [19]

Bergstedt et al.

[11] 4,254,625
[45] Mar. 10, 1981

[54] TURBO CHARGING SYSTEMS

[75] Inventors: Dan Bergstedt, Södertälje; Anders E. B. Johansson, Enhörna, both of Sweden

[73] Assignee: Saab-Scania AB, Södertäje, Sweden

[21] Appl. No.: 965,984

[22] Filed: Dec. 4, 1978

Related U.S. Application Data

[63] Continuation of Ser. No. 758,956, Jan. 13, 1977, abandoned.

[51] Int. Cl.³ ............................................. F02B 37/00
[52] U.S. Cl. .................................... 60/602; 251/61.5; 123/440
[58] Field of Search ................. 60/600, 601, 602, 611, 60/603; 123/41.41, 41.77, 41.85, 188 GC; 251/61.5

[56] References Cited

U.S. PATENT DOCUMENTS

| 2,564,894 | 8/1951 | Glasgow | 251/61.5 |
| 4,075,849 | 2/1978 | Richardson | 60/602 |

FOREIGN PATENT DOCUMENTS

| 2509243 | 9/1976 | Fed. Rep. of Germany | 60/602 |
| 722329 | 12/1931 | France | 123/41.85 |
| 630936 | 10/1949 | United Kingdom | 60/602 |

Primary Examiner—Michael Koczo, Jr.
Attorney, Agent, or Firm—Strimbeck, Davis & Soloway

[57] ABSTRACT

The invention relates to super-charged combustion engines in which a compressor is arranged in the engine inlet system and driven by a turbine in the engine exhaust system, a duct is provided for by-passing the turbine to the exhaust outlet, and a valve is provided to control exhaust gas flow through the by-pass duct and turbine. The invention provides exhaust gas pressure transmitting means connected to actuating means incorporated in the valve, said actuating means operating in dependence upon the pressure of the exhaust gas to control its flow through the turbine and the by-pass duct in order to limit the speed of the turbine and the compressor when a predetermined pressure is exceeded, whereby pressure in the engine inlet system decreases with increasing engine speed, at least within an upper r.p.m. range of the engine. The invention realizes an engine in which a higher fuel economy and performance is achieved, compared with known super-charging arrangements, particularly in that the arrangement according to the invention can be controlled to produce a markedly higher torque within the normal operating range of the engine.

9 Claims, 3 Drawing Figures

TURBO CHARGING SYSTEMS

This application is a continuation of our copending application Ser. No. 758,956, filed Jan. 13, 1977, for Turbo Charging System, now abandoned.

The present invention relates to super-charged combustion engines, preferably otto-cycle engines, of the type in which super-charging is effected by means of a compressor arranged in the inlet system of the engine and driven by a turbine arranged in the exhaust system of said engine which in turn is driven by exhaust gases, said engine comprising a by-pass duct which by-passes the turbine to the outlet pipe of the exhaust system, and a valve which controls the flow of exhaust gas through the by-pass duct and the turbine.

Such an arrangement has previously been known in super-charged otto-cycle engines, particularly in the case of engines for racing vehicles. There the prime object has been to obtain a high total power output when the engine is driven with consequent high engine loads and high engine speeds, and the control of the super-charging of the engine has consequently been designed with regard thereto. Hitherto the exhaust system of the engine has been provided with a valve arranged to control part of the exhaust-gas flow through a so-called Waste-gate, a by-pass duct parallel with the exhaust-gas pipe to the turbine of the super-charger. Opening and closing of this valve is controlled by the inlet pressure of the engine. At a predetermined inlet pressure, the valve opens the by-pass duct to permit exhaust-gases to flow therethrough, thereby relieving the turbine of a part of the exhaust-gas flow. Super-charging of the engine is restricted thereby, but with increasing engine speed there is still an increase in the inlet pressure because the continued opening movement of the valve is unable to compensate for the increased flow of exhaust gas from the engine.

With this known arrangement, the compressor causes a pressure in the inlet system of the engine which increases with increasing engine speed, and this inlet pressure thus reaches a maximum value at the highest r.p.m. of the engine. This factor is decisive for the selection of further engine parameters, for example the compression ratio of the engine and the grade of fuel used. Irrespective of the engine parameters selected, engines whose super-charging is controlled by the aforedescribed known arrangement are primarily intended to operate at high r.p.m., which is the case, for example, with racing vehicles. On the other hand, such engines are uneconomical and totally unsuitable for operation at the relatively low r.p.m. at which ordinary motor vehicles are normally driven.

An object of the present invention is therefore to provide a super-charged combustion engine for normal vehicle use so that a higher fuel economy and a higher performance is achieved within the engine speed range at which the engine mostly operates.

According to this invention, a super-charged combustion engine of the type referred to hereinbefore is characterised in that the valve is associated with exhaust-gas pressure transmitting means, in that said exhaust-gas pressure transmitting means are connected to actuating means incorporated in the valve, and in that said actuating means are arranged to actuate the valve dependent upon the pressure of the exhaust gas, so as to control the flow through the turbine and the by-pass duct respectively when the exhaust-gas pressure exceeds a predetermined level so that the rotary speed of the turbine, and thereby that of the compressor, is limited to values which, at least within an upper r.p.m. range of the engine, causes the pressure in the inlet system of the engine to decrease with increasing engine speed.

With the arrangement according to the invention, it is possible to control the super-charger in such a manner that the engine is given a markedly higher torque within a central r.p.m. range.

For the purpose of achieving a rapid and effective increase in torque at low r.p.m., the turbine and compressor of the super-charger has much smaller dimensions than is normal in a super-charged engine. This means that the engine obtains a progressively increasing degree of effect, this increase being restricted in at least the upper r.p.m. range of the engine so as to prevent self-ignition of fuel fed to the engine. This restriction is effected by the aforementioned reduction of the inlet pressure, whereby a valve spring or the like which actuates the actuating means and which counteracts the opening of the valve is adapted to balance the exhaust-gas pressure at the predetermined level for opening the valve.

By means of the aforementioned reduction in pressure, super-charging of the engine is reduced successively with increasing r.p.m. within the upper r.p.m. range of the engine. This reduction in pressure also reduces the torque output of the engine and between speeds corresponding to the maximum torque and maximum power output of the engine the inlet pressure is reduced successively so that the margin at which self-ignition of the fuel will take place is maintained practically constant. In this respect, the invention provides for lowering of the inlet pressure between said limits at full engine load by at least 10%. This reduction means that the combustion conditions within the higher r.p.m. range of the engine do not necessitate a higher grade of fuel than in the lower r.p.m. range. Thus, in addition to the arrangement of the invention being advantageous from the aspect of fuel economy, an engine provided with such an arrangement also gives a good traction effect, i.e. a high increase in torque is obtained within a large range of engine r.p.m., which is a clear advantage with regard to the manner in which the ordinary motorist normally drives his vehicle.

In addition to the foregoing, the arrangement according to the invention is adapted to fulfill requirements of high reliability at both high and low temperatures, quiet and vibrationless engine running, small dimensions and reasonable costs.

In order that the invention will be more readily understood and further features thereof made apparent, an exemplary embodiment of the invention will now be described with reference to the accompanying drawings, in which.

Figure 1:
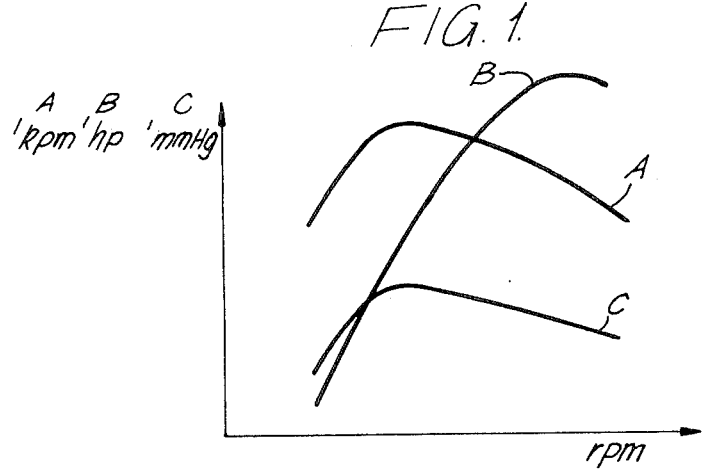
FIG. 1 is a diagram showing r.p.m.-dependent curves representing torque, power and inlet pressure respectively of a super-charged otto-cycle engine controlled by the arrangement according to the invention.

A particular object to be achieved by an arrangement according to the invention is to provide a super-charged otto-cycle engine whose inlet pressure curve, and therefore the torque curve, exhibits maximum values within a central r.p.m. range of the engine substantially corresponding to normal driving of a vehicle at constant speed on a high-way. The principal configuration of these curves is shown in FIG. 1, in which curve A represents the engine torque (traction force), curve B the engine power and curve C the inlet pressure of the engine as a function of the r.p.m. The curves exemplify a specific engine load and the r.p.m. level across which the inlet pressure is reduced varies with the load on the engine so that said level increases with decreasing engine load. As previously mentioned, a motor vehicle with such characteristics gives an excellent low speed traction characteristic. This means that there is less need to change gear when driving, for example the vehicle can be accelerated, such as when overtaking, more rapidly and more positively without it being necessary to change down. Thus, the vehicle can be driven in a higher gear than would otherwise be possible, thereby saving fuel.

Engine torque corresponding to the curve A in FIG. 1 can be obtained with a super-charged engine constructed in accordance with the invention because the super-charger generates sufficient pressure in the inlet system of the engine at relatively low r.p.m. so that the combustion in the engine cyclinders or the like takes place under pressure and temperature conditions which provide a margin for self-ignition of the fuel-air mixture inducted into the engine. This margin can be said to correspond to 1–3 octane units above the level at which the risk of self-ignition of a fuel occurs. In the region above said relatively low engine r.p.m., the power output of the engine continues to increase in accordance with curve B and the resultant increase in operating temperature of the engine tends to increase the risk of self-ignition of the fuel-air mixture. This tendency can be counteracted and eliminated by means of the arrangement according to the invention, since an increase in r.p.m. is accompanied by a progressive decrease of the engine inlet pressure, so that the aforementioned margin of self-ignition of the fuel is maintained practically constant.

The decrease in inlet pressure from the level prevailing at the r.p.m. for maximum torque to the level prevailing at the r.p.m. for maximum engine power is illustrated in curve C, FIG. 1, as a straight line representing the average value of decrease in pressure in response to r.p.m. This enables the decreasing pressure to be expressed specifically in mm Hg per 100 r.p.m. With an arrangement according to this invention a specific pressure decrease in excess of 2 mm Hg per 100 r.p.m. is envisaged. Preferably, however, the total decrease in pressure between said limits with full engine load is greater than 10%.

Figure 2:
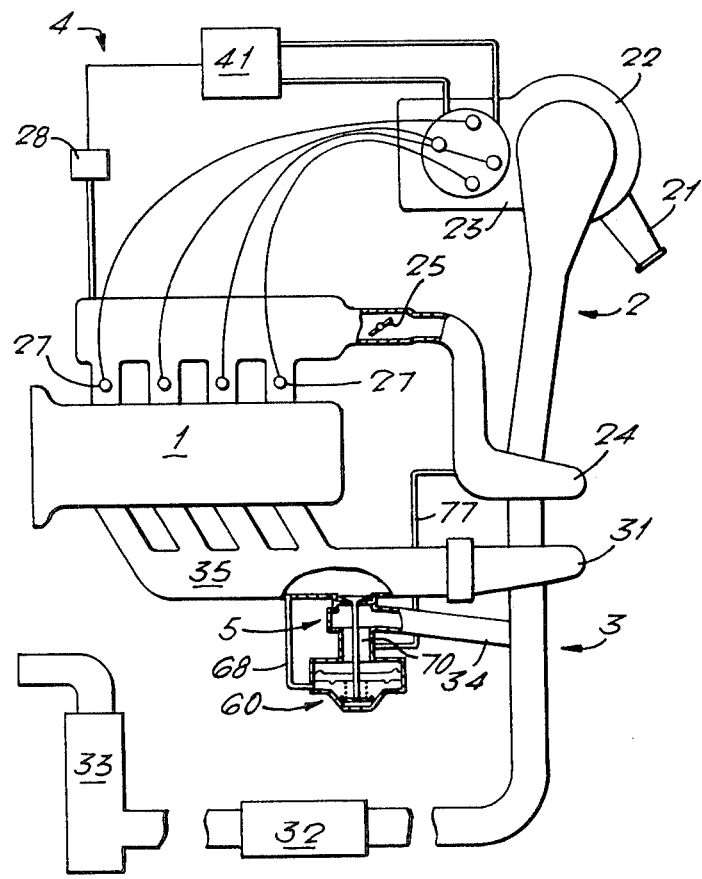
FIG. 2 is a schematic view of a preferred embodiment of the arrangement according to the invention.

In the embodiment illustrated in FIG. 2 super-charging of the engine is controlled so that the inlet pressure of the engine conforms to the curve C in FIG. 1. FIG. 2 shows a conventional otto-cycle engine 1 provided with an inlet system 2 and an exhaust-gas system 3. The inlet system 2 is provided with an air-intake silencer 21 which conducts air through an air filter in a filter housing 22 before the air is led further in the inlet system 2. The air flowing to the engine 1 is fed to an air-measuring device 23 comprising part of a fuel injection system 4. After passing through the filter housing 22 the air is passed to a compressor 24 in which it is compressed, thereby increasing the pressure in the inlet system downstream of the compressor. The consequent pressure increase in the inlet system 2 of the engine means that the engine is super-charged. The compressor 24 shown in FIG. 2 is a centrifugal compressor driven by a turbine 31 arranged in the exhaust system 3 of the engine 1, i.e. super-charging is effected by means of a type of super-charging unit well known in the Art, a so-called turbo-charger.

Arranged in the engine inlet system 2 is a throttle valve 25 by means of which the quantity of air, and thereby also the quantity of fuel, passing to the engine can be controlled by the driver of the vehicle, by actuating an external operating device, such as an accelerator pedal (not shown). Fuel is supplied to the compressed air fed to the engine via a fuel injection nozzle 27 arranged in respective inlet pipes of the inlet manifold. The quantity of fuel injected is regulated with respect to the measured quantity of air in the air measuring device 23. The inlet system 2 is also provided with a pressure governor 28 which actuates the control means 41 of the fuel injection system to interrupt the supply of fuel when the maximum permitted pressure is exceeded in the inlet system 2.

Exhaust gases leaving the engine are used to drive the turbine 31 of the super-charger before the exhaust gases are passed to atmosphere, optionally via a catalytic convertor 32 and a sound muffler 33. The exhaust system 3 also includes a by-pass duct 34, a so-called Wastegate, which by-passes the turbine 31. The flow of exhaust gas through the by-pass duct 34 is regulated by a valve 5. Provided the valve 5 is closed, all the exhaust gas will flow through the turbine 31, and the compressor 24 can thereby provide maximum super-charging in the inlet system 2. Depending upon the angular position of the throttle valve 25, however, which position is manually controlled by the driver of the vehicle, a certain portion of the increased pressure in the inlet system will be reduced via the valve 25.

With this arrangement, it is intended to provide a high degree of super-charging at relatively low r.p.m. To this end, the turbine 31 and compressor 24 of the super-charger are so dimensioned that even the relatively small amount of exhaust gas given off by the engine at low r.p.m. is able to cause the turbine, and thereby the compressor, to rotate in a manner such that a relatively high degree of super-charging is obtained at low engine speeds.

As the engine speed increases so the quantity of exhaust gas increases and thereby also the exhaust-gas pressure, and with the load variation to which the engine is likely to be subjected in normal use, the exhaust-gas pressure will reach the level at which the turbine 31 drives the compressor 24 to super-charge the engine at a predetermined maximum permitted pressure. To avoid, or at least to reduce, continued super-charging of the engine and instead to reduce the charging pressure in the inlet system 2 with continued increase in the engine speed, the valve 5 of the arrangement shown in FIG. 2 is controlled to open the by-pass duct 34 to permit exhaust gas to pass therethrough when a certain pressure has been reached in the exhaust manifold 35 upstream of the turbine 31.

Figure 3:
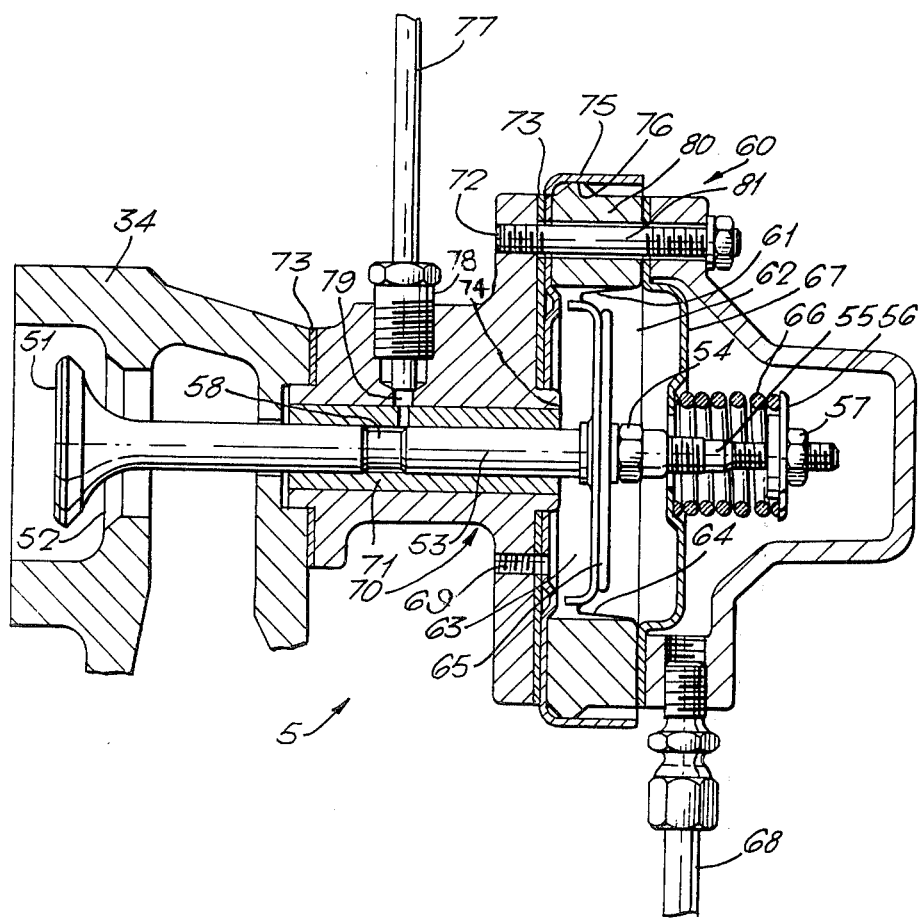
FIG. 3 is a longitudinal sectional view of a preferred embodiment of a valve forming part of the arrangement according to the invention.

In an advantageous embodiment of the invention, this function is achieved by means of the valve 5 shown in FIG. 2 and, in more detail, in FIG. 3. The valve 5 is arranged to regulate the inlet to the by-pass duct 34 as seen in the direction of flow of the exhaust gas, so as to avoid that the exhaust gas remaining in the by-pass duct 34 acting to damp the pulses occurring in the exhaust manifold 35, which pulses favourably affect the r.p.m. of the turbine even with relatively small quantities of exhaust gas flowing. Further, this positioning of the valve enables the valve plate, or parts connected thereto to penetrate the exhaust manifold 35, passing to the turbine 31 when the valve 5 is opened and in this way disturb the flow of exhaust gas to and through the turbine 31. Construction problems and certain aspects relating to cooling of the valve 5, however, often justify positioning of the valve 5 adjacent the front of the vehicle. FIG. 3 shows a valve construction intended to be placed adjacent to the front of the vehicle with a connection to the opening of the by-pass duct 34 into the outlet side of the exhaust pipe downstream of the turbine 31.

The valve 5, which is shown in its open position in FIG. 3, comprises a number of parts joined together by screws 81, a valve housing 60, a support plate 67, an intermediate ring 80, a centre plate 75, a gasket 73 and a bearing housing 70. The bearing housing 70 has fixedly arranged therein a valve guide 71 for an axially moveably valve spindle 53. The valve spindle is of the disc type and the disc 51 is arranged to co-act with a seating 52 arranged in the outlet from the by-pass duct 34. Arranged between the valve housing 60 and the intermediate ring 80 is the support plate 67 and a diaphragm 61 which divides an internal space formed by the valve housing 60 and the intermediate ring 80 into two chambers, an outer chamber 62 and an inner chamber 63. The diaphragm 61 is a roll diaphragm and is attached to the valve spindle 53 by means of two plates 65 each of which is clamped to the valve spindle 53 on respective sides of the diaphragm 61 by means of locking nuts 54.

When the valve spindle 53 is moved axially, a ring-shaped outer portion 64 of the diaphragm 61 rolls-off relative to the housing 60. The inner end 55 of the valve spindle 53 projects into the outer chamber 62 and is there provided with a screw-threaded end support plate 56 for a pressure spring 66, the other end of which abuts the support plate 67. The support plate 67 is provided with a central hole for the free through-passage of the end portion 55 of the valve spindle and the nut 54 screwed thereon. The purpose of the spring 66 is to counteract the opening movement of the valve 5. The axial position of the end support plate 56, which is locked by means of a nut 57, determines the pre-tension of the spring 66.

The outer chamber 62 is in direct communication, via a line 68, with the exhaust manifold 35 upstream of the turbine 31 and the connection of the by-pass duct 34 to the manifold 35 (see FIG. 2). The line 68 transmits the pressure in the exhaust manifold 35 to the chamber 62, whereby the diaphragm 61 is subjected to a force which causes the valve 5 to open. To eliminate problems during cold weather, it is important that the line 68 along the whole of its extension from the exhaust manifold 35, is inclined upwardly relative to the horizontal plane to prevent icing up of condensate.

The inner chamber 63 communicates, via a hole 69 in the bearing housing 70, with atmosphere or with the inlet system of the engine upstream the compressor 24. The hole 69 is small, however, relative to the volume of the chamber 63, and hence the chamber 63 will act as a means for damping movement of the diaphragm 61 and the valve spindle 53.

The bearing housing 70 is provided with an annular shoulder 74 which projects centrally into the chamber 63 and on which the gasket 73 and the centre plate 75 are adjusted to the external diameter of said shoulder through central openings. The centre plate 75 is provided with an annular outer flange 76 which is a good fit around the intermediate ring 80 thereby ensuring that the intermediate ring 80 is correctly aligned relative to the valve spindle 53 and elements associated therewith, such as the diaphragm 61. As the valve moves, the rolling, outer portion 64 of the diaphragm 61 will operate under the influence of uniformly distributed forces, which is favourable to the useful life of the diaphragm 61. The centre plate 75 also causes heat transmission from the bearing housing 70 to the intermediate ring 80 and the valve housing 60 to be less than would otherwise be the case if the intermediate ring 80 and/or the housing 60 had been arranged to directly abut the bearing housing 70. Measures to restrict temperature transmission to the valve housing 60 prolong the useful life of both the diaphragm 61 and the spring 66.

For cooling purposes compressed air from the inlet system 2, downstream of the compressor 24, is passed to the bearing housing 70 by means of a line 77. The line 77 is sealingly connected to the bearing housing 70 by means of a conventional coupling sleeve 78 and communicates with a hole 79 bored in the bearing housing 70, from which hole compressed air is passed to the longitudinally extending bearing surface between the valve guide 71 and the valve spindle 53. In an axial position corresponding to the hole 79 the valve spindle 53 is provided with a cut-out portion 58 so as to facilitate spreading of cooling air over the entire bearing surface and thereby also to cleanse said surface from any dirt thereon. The compressed air seeps out along the bearing surface and escapes on the one hand in the outlet line of the exhaust pipe and on the other hand into the damping chamber 63 and therefrom to atmosphere through the hole 69, or at times back to the inlet system of the engine upstream of the compressor 24.

In operation, the actuating means of the valve, in the illustrated embodiment the diaphragm 61 and the plate 65, constantly sense the pressure in the exhaust manifold 35 via the line 68. The pressure of the exhaust gas in the chamber 62 will increase with increasing engine speed and increasing load on the engine. At a certain engine load, and a corresponding engine speed, the pressure of the exhaust gas will reach a level at which the roller diaphragm 61 will move in a direction to open the valve 5. The exhaust pressure in the chamber 62 will then exert a force on the diaphragm 61 and the valve spindle 53 which counteracts and exceeds the biasing force of the spring 66 and the counterforce exerted by the exhaust gas pressure on the valve disc 51 when the valve 5 is closed. The area of the respective surfaces of the diaphragm 61 and the valve disc 51, and the extent to which the spring 66 is pre-tensioned, thus decide the pressure at which the valve 5 will open. Opening of the valve 5 causes a certain quantity of exhaust gas to flow through the by-pass duct 34, whereupon the flow to the turbine 31 is restricted as a result thereof. Control of the super-charging of the engine above a predetermined level of exhaust-gas pressure dependent upon increased engine speed is realised by tapping the flow through the turbine 31, via the by-pass duct 34 in the exhaust gas system, so that the compressor 24 is unable to maintain the inlet pressure at high engine speeds. An increase in engine speed is accompanied by an increase in the flow of exhaust gas and the valve 5, and particularly the spring 66 in the housing 60, is so adapted that said valve opens successively throughout the total upper r.p.m. range of the engine to take a fully open position only when the maximum flow of exhaust gas prevails. Because the spring 66 offers a greater resistance, the more the spring is compressed, a progressively higher pressure is required in the chamber 62 during the opening movement to further open the valve 5. Thus, the exhaust-gas pressure increases upstream of the turbine 31 but in the case of an open valve this increase in pressure is not sufficient to supply to the turbine 31, and therefore the compressor 24, that additional amount of power required to hold the inlet pressure constant when the engine speed increases. Consequently there is a reduction of the inlet pressure, and this reduction can be controlled by varying the spring rate of the spring 66.

Any tendency of the valve to flutter, as is normally the case when a valve plate leaves the valve seating and is subjected to pulses of exhaust-gas, is suppressed with the arrangement described by the damping force from the chamber 63. The volume of air in the chamber 63 is unable to escape through the venthole 69 rapidly enough. This means that very rapid movements of the diaphragm 61 give rise to immediate changes in pressure in the chamber 63 which rapidly counteract the flutter movement of the diaphragm 61 and thereby the valve spindle 53. On the other hand, the relatively slow movements made by the valve spindle 53 dependent upon an increase or decrease of the level of exhaust-gas pressure in the outer chamber 62 are not affected.

The supply of compressed air from the inlet system 2 of the engine to the bearing surface between the valve guide 71 and the valve spindle 53 also serve to prevent exhaust gases from penetrating into said bearing surface and therefrom into the chamber 63. The diaphragm 61 in particular should be protected from excessively high temperatures. The useful life of the bearing surface between the valve guide and the valve spindle will also be increased if low temperatures can be maintained in the bearing and if impurities in the form of particles of soot or the like from the exhaust gases can be avoided. Air from the inlet system 2 of the engine downstream of the compressor 24 has a higher pressure than the pressure in the exhaust gas system 3, whereby compressed air charged to the bearing housing 70 can be forced along the bearing surface between the valve guide 71 and the valve spindle 53 and out into the exhaust gas system 3 and into the chamber 63. Practical tests carried out on the described arrangement have shown that said arrangement satisfies all the objects hereinbefore mentioned. A substantially smaller turbine than is normal for a super-charged engine of comparable size is used to super-charge the engine via a compressor, so that said engine at an engine speed corresponding to normal constant driving of a vehicle on a high-way is able, at full load, to develope a torque which is approximately 45% higher than that which the same engine could develop under the same driving conditions without a super-charger. The additional power of the engine up to said r.p.m. level follows a substantially straight line depending on the r.p.m. of the engine.

As the engine speed continues to increase a large percentage of the exhaust-gas flow through the by-pass duct is tapped off so that the inlet pressure is decreased, whereupon the torque is progressively decreased and the amount of additional power to the engine becomes smaller and smaller to finally limit the maximum output of the engine to a value which exceeds by only approximately 20% that which the engine can otherwise perform without super-charging. In other words the torque and additional power developed by the super-charger substantially improves operating conditions with normal driving of a vehicle, particularly at speeds lower than 110 km/h.

The invention is not restricted to the illustrated and exemplified embodiments, but can be modified within the scope of the accompanying claims.

We claim:

1. In combination with an Otto cycle internal combustion engine for a motor vehicle, said engine having an intake system for introducing an air-fuel mixture into said engine, an exhaust manifold for removing exhaust gases from said engine, and a super-charging system including a compressor which communicates with said intake system for increasing the supply of air-fuel mixture introduced into said engine, and a turbine arranged in a housing connected to said exhaust manifold and adapted (1) to be driven by said exhaust gases, and (2) to drive said compressor; said super-charging system comprising, in combination:

a duct connected to said exhaust manifold for directing exhaust gases to by-pass said turbine;

a control valve for controlling the amount of exhaust gases flowing through said duct from said exhaust manifold;

exhaust gas pressure-transmitting means mounted in said exhaust manifold and connecting said exhaust manifold, upstream of said turbine with said control valve;

said duct and said control valve being mounted separately in relation to said turbine housing;

said control valve comprising a valve actuator mechanism connected to said exhaust gas pressure-transmitting means for actuating said control valve in dependence of the exhaust gas pressure;

said control valve being of the disc-valve type including a valve spindle connected to said valve actuator mechanism;

a spring in said valve actuator mechanism acting upon said valve spindle to hold said valve closed;

said control valve having a sealing face on the face of said valve disc adjacent said spindle for cooperating with a valve seating, the opposite face of said valve disc facing said exhaust manifold so as to be exposed to full exhaust gas pressure, whereby said control valve is biased to a closed position in which the sealing face of said valve disc blocks the flow of exhaust gases through said by-pass duct, by both said spring and the exhaust gas pressure in the exhaust manifold upstream of said turbine acting upon said opposite face of said valve disc; and said control valve being biased to an open position, when the exhaust gas pressure acting upon said valve actuator mechanism is above a predetermined level.

2. The combination according to claim 1, and including a bearing housing mounted via gaskets on one side to the exhaust line downstream of said turbine and on the other opposite side to said valve housing, and a valve guide fixed within said bearing housing for mounting said valve spindle for axial movement in said valve guide.

3. The combination according to claim 1, and including an adjustable fastening means for attaching said spring to said valve spindle under a predetermined tension, and said valve housing includes a removable outer housing for permitting adjustment of the tension of said spring.

4. The combination according to claim 2, wherein said valve housing is divided by means of said diaphragm into an inner and outer chamber, said outer chamber being connected to said exhaust gas pressure transmitting means; and said bearing housing comprises a one piece valve guide having an axially elongate opening for accommodating said valve spindle, and wherein one end of said valve guide opens into said inner chamber and the other end of said valve guide opens into the exhaust line downstream of said turbine.

5. The combination according to claim 4, and including an aperture formed in said bearing housing, and extending to said valve guide, and conduit means connecting the outlet of said compressor and said aperture for feeding compressed air from said compressor through said aperture onto the axially elongate bearing surface between said valve guide and said valve spindle.

6. The combination according to claim 1, wherein said exhaust gas pressure-transmitting means connecting said exhaust system to said control valve has its connection to said control valve as its vertically upper position.

7. In combination with an Otto cycle internal combustion engine for a motor vehicle, said engine having an intake system for introducing an air-fuel mixture into said engine, an exhaust manifold for removing exhaust gases from said engine, and a super-charging system including a compressor which communicates with said intake system for increasing the supply of air-fuel mixture introduced into said engine, and a turbine arranged in a housing connected to said exhaust manifold and adapted (1) to be driven by said exhaust gases, and (2) to drive said compressor; said super-charging system comprising, in combination, a duct connected to said exhaust manifold for directing exhaust gases to by-pass said turbine;

a control valve for controlling the amount of exhaust gases flowing through said duct from said exhaust manifold;

exhaust gas pressure-transmitting means having an inlet mounted in said exhaust manifold and connecting said exhaust manifold, upstream of said turbine with said control valve;

said duct and said control valve being mounted separately in relation to said turbine housing;

said control valve comprising a valve actuator mechanism connected to said exhaust gas pressure-transmitting means for actuating said control valve in dependence of the exhaust gas pressure;

said valve actuator mechanism having a valve housing being divided by means of a diaphragm into an inner and an outer chamber;

said outer chamber being connected to said exhaust gas pressure-transmitting means;

said control valve being of the disc-valve type including a valve spindle mounted to said valve actuator mechanism;

a bearing housing mounted via gaskets on one side to the exhaust line downstream of said turbine and on the other opposite side to said valve housing, said bearing housing comprising a one piece valve guide having an axially elongate opening for accommodating said valve spindle;

a valve guide fixed within said bearing housing for mounting said valve spindle for axial movement in said valve guide, one end of said valve guide opening into said inner chamber and the other end of said valve guide opening into the exhaust line downstream of said turbine;

an aperture formed in said bearing housing, and extending to said valve guide, and conduit means connecting the outlet of said compressor and said aperture for feeding compressed air from said compressor through said aperture onto the axially elongate bearing surface between said valve guide and said valve spindle, a spring in said valve actuator mechanism acting upon said valve spindle to hold said valve closed;

said control valve having a sealing face on the face of said valve disc adjacent said spindle for cooperating with a valve seating, the opposite face of said valve disc facing said exhaust manifold so as to be exposed to full exhaust gas pressure whereby said control valve is biased to a closed position, in which the sealing face of said valve disc blocks the flow of exhaust gases through said by-pass duct, by both said spring and the exhaust gas pressure in the exhaust manifold upstream of said turbine acting upon said opposite face of the valve disc; and said control valve being biased to an open position, when the exhaust gas pressure acting upon said diaphragm is above a predetermined level.

8. The combination according to claim 7, and including an adjustable fastening means for attaching said spring to said valve spindle under a predetermined tension, and said valve housing includes a removable outer housing for permitting adjustment of the tension on said spring.

9. The combination according to claim 7, wherein said exhaust gas pressure-transmitting means connecting said exhaust system to said control valve has its connection to said control valve as its vertically upper position.

* * * * *